US008286655B2

(12) United States Patent
Farrelly (10) Patent No.: US 8,286,655 B2
(45) Date of Patent: Oct. 16, 2012

(54) LINE STOP ADAPTER

(75) Inventor: Robert E. Farrelly, Windsor, CT (US)

(73) Assignee: The Jack Farrelly Company, Bloomfield, CT (US)

( * ) Notice: Subject to any disclaimer, the term of this patent is extended or adjusted under 35 U.S.C. 154(b) by 1185 days.

(21) Appl. No.: 12/072,781

(22) Filed: Feb. 28, 2008

(65) Prior Publication Data

US 2009/0218532 A1    Sep. 3, 2009

(51) Int. Cl.
*F16L 55/10*    (2006.01)
*F16K 51/00*    (2006.01)
(52) U.S. Cl. ........ 137/15.12; 137/318; 138/90; 285/197
(58) Field of Classification Search .................. 137/318, 137/317, 15.12, 15.13; 138/90; 285/197
See application file for complete search history.

(56) References Cited

U.S. PATENT DOCUMENTS

| | | | | |
|---|---|---|---|---|
| 3,773,067 A * | 11/1973 | Ray | | 137/318 |
| 4,097,073 A | 6/1978 | Van Houtte | | 285/197 |
| 4,168,089 A | 9/1979 | Hulslander et al. | | 285/197 |
| 4,708,373 A | 11/1987 | Morriss, Jr. | | 285/156 |
| 5,040,828 A | 8/1991 | Kane | | 285/197 |
| 5,374,087 A | 12/1994 | Powers | | 285/197 |
| 5,553,898 A | 9/1996 | Rogers, Jr. | | 285/197 |
| 5,797,423 A * | 8/1998 | Abbad et al. | | 285/197 |
| 5,924,436 A * | 7/1999 | Kitani et al. | | 137/318 |
| 6,019,398 A | 2/2000 | Powers | | 285/148.19 |
| 6,227,234 B1 | 5/2001 | Powers | | 137/322 |
| 6,286,553 B1 * | 9/2001 | Morgan | | 138/90 |
| 6,311,721 B1 | 11/2001 | Aaron | | 137/363 |
| 6,360,771 B2 | 3/2002 | Powers | | 137/322 |
| 7,070,209 B2 | 7/2006 | Collins | | 285/373 |
| 7,104,572 B1 | 9/2006 | Kane | | 285/199 |
| 2001/0007263 A1 | 7/2001 | Powers | | 137/322 |

OTHER PUBLICATIONS

Drawing 832-6 × 6 × 4.50 E (LSA) JCM Industries, Inc., Nash, TX, Dated Jan. 21, 2003.
Drawing 832-8 × 8 × 4.50 E (LSA) JCM Industries, Inc., Nash, TX, Dated Jan. 21, 2003.
Drawing 832-8 × 8 × 6 (LSA) JMC Industires, Inc., Nash, TX, Dated Jan. 26, 2007.

* cited by examiner

*Primary Examiner* — Kevin Lee
(74) *Attorney, Agent, or Firm* — Alix, Yale & Ristas, LLP

(57) ABSTRACT

A line stop adapter includes a body having a tapping flange mounting surface, adapted for mounting to a tapping sleeve flange, and an opposing valve mounting surface, adapted for mounting to a temporary valve. An interior wall forms a body aperture fluidly connecting the mounting surfaces. A portion of the interior wall is adapted to receive and selectively engage a completion plug, allowing the completion plug to fluidly seal the body aperture. Multiple engagement portions are arranged around the body aperture for securing the tapping flange mounting surface to the tapping sleeve.

15 Claims, 7 Drawing Sheets

FIG. 1

PRIOR ART

FIG. 2

PRIOR ART

FIG. 3

PRIOR ART

LINE STOP ADAPTER

FIELD

The present disclosure relates generally to fittings used to temporarily stop the flow of fluid in a pipeline. It is more particularly concerned with an adapter to allow a tapping sleeve to be used as a line stop fitting.

BACKGROUND

Fluids are hereby defined to be any material that is non-solid in its natural condition or materials that may be converted to and maintained in a non-solid state. Some fluid distribution systems, such as for the distribution of potable water, have been used for over one hundred years. Such systems comprise a fluid source such as a well or filtration plant, a main or distribution line connected to the source and smaller lateral lines connecting the main line to users. The main line can range in size from four inches in diameter to thirty inches or more in diameter. The main line can also be formed from a variety of materials such as iron, steel, cement or polymer. Often, a new lateral line will be required to supply a new user. It is desirable to connect the new lateral line to the main line without shutting off fluid flow to other users connected to the main line.

To fluidly connect the new lateral line to the main line without shutting off fluid flow in the main line a tapping sleeve can be used. A tapping sleeve comprises two mating saddles that are oppessedly mounted over the pipeline. A gasket is disposed between one or both saddles and the pipeline. One of the saddle sections includes a radially projecting standoff terminating in a distal flange.

In use, one set of two saddles and a gasket is secured over the pipeline where connection with the new lateral line is desired. When the saddles are fastened the gasket is clamped between the pipe and the saddles, providing a fluid seal. A valve is secured to the saddle flange. A drilling apparatus is secured to the valve. The drilling apparatus is used to drill through the pipe, after which the drill is retracted and the valve is closed. The drilling apparatus is removed. The new lateral line is fluidly connected to the valve. When the valve is opened fluid is supplied to the new lateral line and the new user.

The valve is left secured to the tapping sleeve flange during use. Thus, there is no provision to fluidly seal the tapping sleeve flange apart from use of the secured valve.

In some instances, a distribution pipeline must be relocated. In other instances the distribution pipeline will break requiring repair. Often such work must be conducted quickly to return the distribution pipeline back into service. However, there may be no valve suitably positioned to turn off fluid flow in the main pipeline to allow the work to be conducted. In other cases it may not be possible to turn off fluid flow to the damaged section of pipeline without also turning off the flow to a critical user such as a hospital. In these cases a "line stop fitting" and system can be used. The line stop fitting comprises two mating saddles that are oppessedly mounted over the pipeline adjacent the section that has broken or that needs to be moved. A gasket is disposed between one or both saddles and the pipeline. One of the saddle sections includes a radially projecting standoff terminating in a distal flange.

In use, a first set of two saddles and a gasket is secured over the main pipeline adjacent one side of the broken section. A second set of two saddles and a gasket is secured over the main pipeline adjacent the opposing side of the broken section. When the saddles are fastened the gasket is clamped between the pipe and the saddles, providing a fluid seal. A valve is secured to each saddle flange. In some variations a temporary pipe connects the valves to allow fluid flow around the broken section. A drilling apparatus is secured to each valve. The drilling apparatus is used to drill through the pipe, after which the drill is retracted and the valve is closed. The drilling apparatus is removed and a line stop apparatus is secured to each valve. The line stop apparatus comprises an expandable head on a movable ram. The valve is opened and a head of the line stop apparatus is forced into the interior of the pipe. Expansion of the line stop head into the interior of the pipe prevents fluid from moving past the head, stopping fluid flow in the main pipeline only immediately adjacent the broken section. With fluid flow stopped by the line stop head repairs can be made.

After repairs have been made to the main pipeline, the line stop heads are retracted allowing fluid communication through the repaired pipe. The valves are closed and the line stop head is removed. A completion plug is placed into the line stop apparatus. The valves are opened and the completion plug is received into, and engaged with, the interior of line stop fitting flange. Typically, the completion plug is threadedly engaged with threads in the interior of the line stop flange or set screws within the saddle flange rim are engaged into a recess in the completion plug periphery. When the completion plug is received into, and engaged with, the line stop fitting flange fluid flow through the saddle flange is prevented. The line stop apparatus is removed, the valve is removed and a blind flange and seal is placed over the top of the saddle flange.

Once the repair has been made there is usually no need to return to the repair site. Thus it is undesirable to leave the two valves, which can cost hundreds to thousands of dollars each, on the line stop flange. Hence the use of a relatively inexpensive completion plug and blind flange for sealing the line stop fitting.

While somewhat similar in appearance, a tapping sleeve and a line stop fitting can not be interchanged. The tapping fitting does not have provisions for use with a completion plug. Further, each manufacturer designs their line stop apparatus to work with their own respective line stop fitting. Thus, a line stop fitting from one manufacturer may not be compatible with a line stop apparatus from another manufacturer. To ensure quick repairs to essential distribution pipelines a maintenance department must stock a tapping sleeve for each pipeline size used in the fluid distribution network as well as a line stop fitting for each pipeline size used in the fluid distribution network. Since each line stop fitting can cost hundreds or thousands of dollars this double stocking requires a significant budget as well as room to store both the large tapping sleeves and the large line stop fittings.

SUMMARY

Briefly, the line stop adapter disclosed herein allows a conventional tapping fitting to be used in a line stopping operation. The tapping fitting is mounted to a pipe. The line stop adapter is mounted to the tapping fitting. A valve and line stop apparatus is mounted to the line stop adapter. The line stop apparatus is used to temporarily stop fluid flow within the pipe, such as might be needed for pipe repairs. When the line stop operation is complete a completion plug is engaged with the line stop adapter to prevent fluid flow through the line stop adapter and the valve and line stop apparatus can be removed.

One aspect of the disclosure is a line stop adapter that will allow a tapping sleeve to be used as a line stop fitting. Another aspect of the present disclosure is a line stop adapter that will receive and engage a completion plug. A further aspect of the disclosure is a system and method for stopping fluid flow in pipe.

In general, unless otherwise explicitly stated the disclosed methods, articles and materials may be alternately formulated to comprise, consist of, or consist essentially of, any appropriate steps or components herein disclosed. The disclosed methods, articles and materials may additionally, or alternatively, be formulated so as to be devoid, or substantially free, of any steps, components, materials, ingredients, adjuvants or species used in the prior art or that are otherwise not necessary to the achievement of the function of the present disclosure.

When the word "about" is used herein it is meant that the amount or condition it modifies can vary some beyond that so long as the advantages of the disclosure are realized. The skilled artisan understands that there is seldom time to fully explore the extent of any area and expects that the disclosed results might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein. It is not difficult for the artisan or others to determine whether such an embodiment is either as expected or, because of either a break in the continuity of results or one or more features that are significantly better than reported in this disclosure, is surprising and thus an unobvious teaching leading to a further advance in the art.

A better understanding will be obtained from the following detailed description of the presently preferred, albeit illustrative, embodiments of the invention.

BRIEF DESCRIPTION OF THE DRAWINGS

Referring now to the drawings wherein like elements are numbered alike in the several Figures.

DETAILED DESCRIPTION

For simplicity this disclosure will reference use with potable water systems, although it will encompass use with other fluidic systems including sewage, gas and chemicals. Pipes used to carry potable water spans sizes from under one inch to more than thirty inches and can be formed from numerous materials including iron, steel, cement and polymer. Pipes used to distribute water are called mains. Laterals are pipes that transport water from the distribution system to a user.

Figure 1:
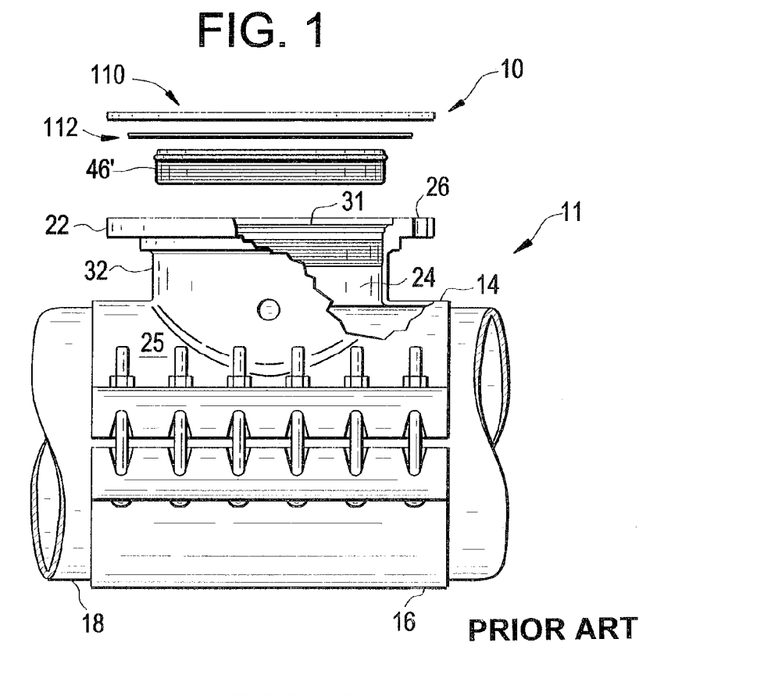
FIG. 1 is an exploded side view of a conventional line stop fitting assembly.
Figure 2:
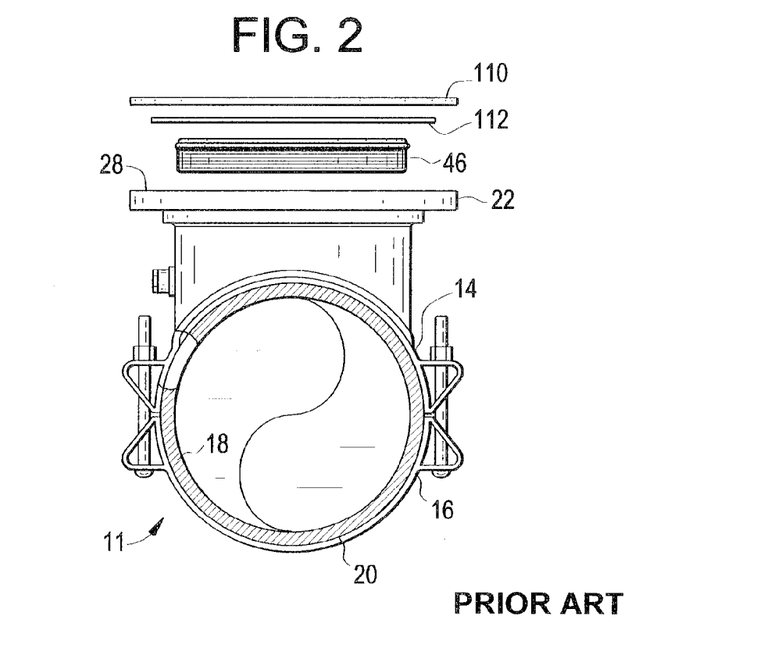
FIG. 2 is an exploded end view of a conventional line stop fitting assembly.
Figure 3:
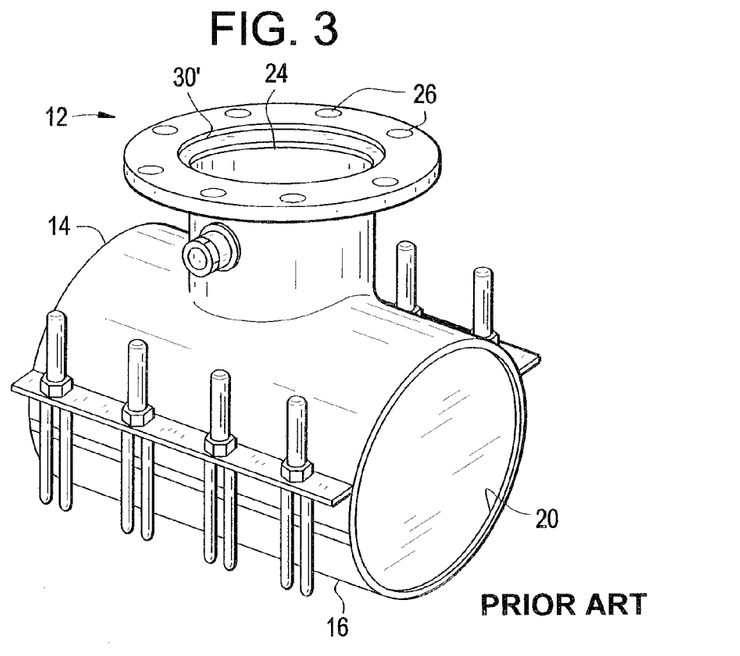
FIG. 3 is a perspective view of one embodiment of a conventional tapping sleeve.

A line stop fitting 11 or tapping sleeve 12 comprises two, mating, semi-cylindrical saddle sections 14, 16 that can be oppessedly mounted over the pipe 18. A gasket 20 is disposable between one or both of the saddle sections 14, 16 and the pipe 18. One of the saddle sections 14 includes a radially projecting flange 22 defining a central aperture 24 fluidly connected to the saddle 25. The flange 22 is typically circular and defines a plurality of apertures 26 spaced around the central aperture 24. The flange 22 includes a mounting face 28. A recessed portion 30, 30' extends below the mounting face 28 and around the central aperture 24. In a line stop fitting, the recessed portion is threaded 31. In a tapping sleeve, the recessed portion 30' accepts a mating projection in a tapping or permanent valve (not shown) to help center the valve to the flange 22. Typically, a cylindrical standoff 32 is disposed between the saddle 25 and the flange 22 to allow working clearance between the pipe 18 and the valve.

Figure 4:
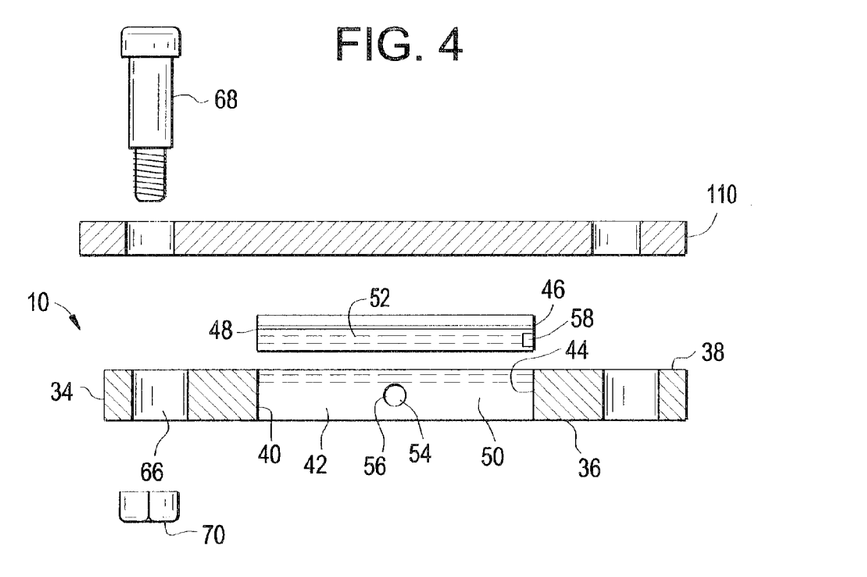
FIG. 4 is a sectional view of a first embodiment of a line stop adapter and a completion plug and blind flange.

In one embodiment the line stop adapter 10 comprises a body 34 including a first mounting surface 36 and an opposing second mounting surface 38. Typically the mounting surfaces 36, 38 will be circular although this disclosure encompasses any advantageous shape.

The body 34 includes an interior wall 40 defining a body aperture 42 extending between, and fluidly connecting, the mounting surfaces 36, 38. The interior wall 40 includes a wall portion 44 adapted to receive and selectively engage a completion plug 46. Typically the wall portion 44 defines a circular body aperture to receive a circular completion plug 46 and the completion plug comprises a circumferential seal 48. Selective engagement of the interior wall portion 44 and completion plug seal 48 will fluidly seal the body aperture 42 preventing fluid movement between the mounting surfaces 36, 38. In one embodiment the wall portion 44 comprises internal threads 50 which engage external threads 52 on the completion plug 46. In another embodiment the wall portion comprises a radially oriented aperture 54 connecting the exterior of the body 34 with the body aperture 42. A pin 56 disposed within the wall portion aperture 54 can engage a recess 58 in the completion plug 46 to maintain the completion plug 46 within the body aperture 42. The completion plug seal prevents fluid from reaching the wall portion aperture. In some variations the wall portion aperture is internally threaded to engage with external threads on the pin.

Figure 5:
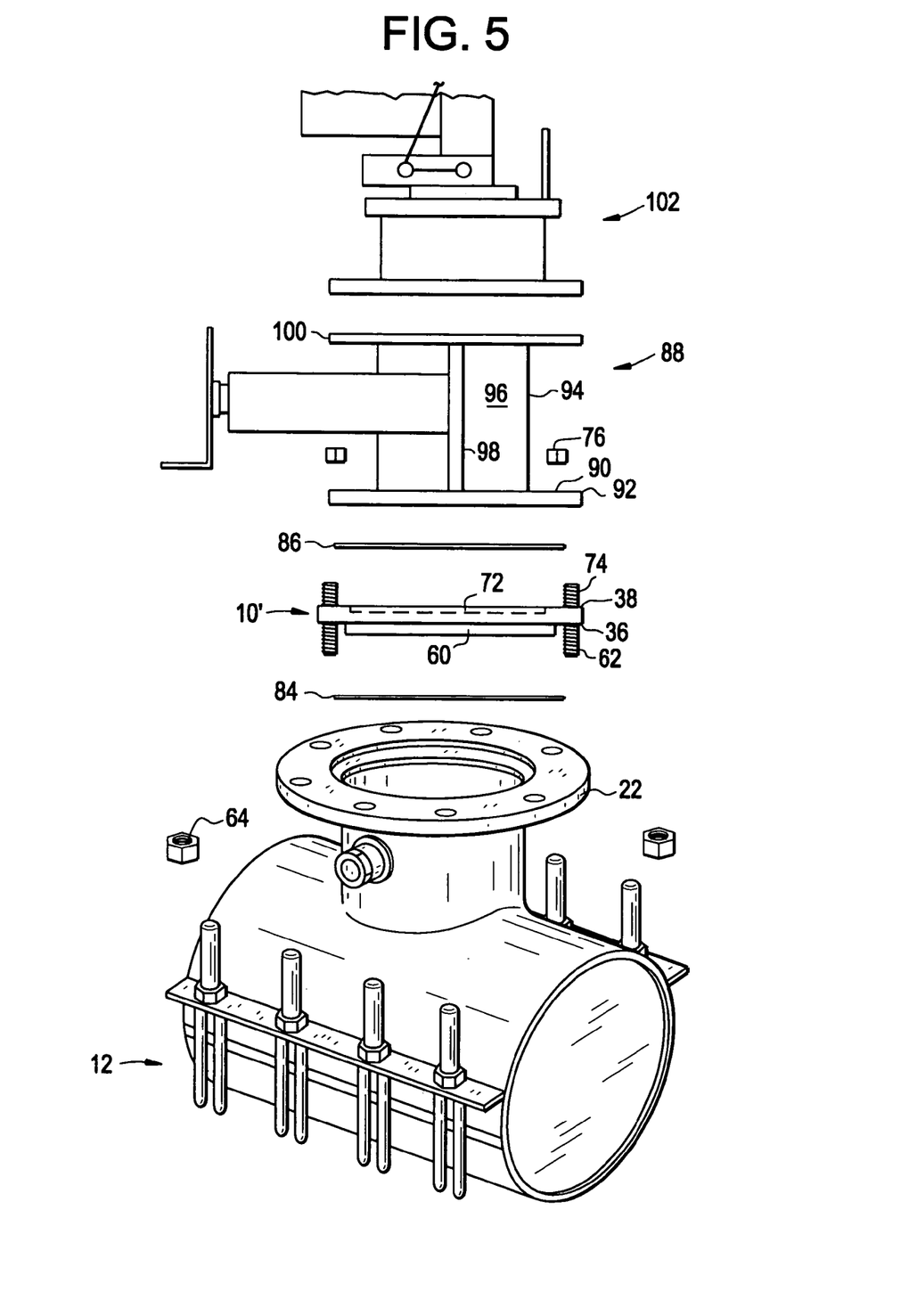
FIG. 5 is a perspective, exploded view of a line stop system comprising a conventional tapping fitting, a completion plug, a blind flange, and the line stop adapter of FIG. 4.

The first mounting surface 36 is typically planar and adapted to provide a fluid tight joint when mounted to a tapping sleeve flange 22. The first mounting surface 36 can optionally include a centering region 60 extending around part or all of the body aperture 42 and projecting outwardly from the surface 36 to help center the line stop adapter 10 to the tapping sleeve flange 22 (FIG. 5).

The body 34 includes a plurality of engagement portions arranged around the body aperture 42 for securing the first mounting surface 36 to the tapping sleeve flange 22. In some embodiments the engagement portions comprise studs 62 fastened to the first mounting surface 36 and projecting outwardly therefrom (FIG. 5). The studs are disposable through apertures 26 in the tapping sleeve flange 22. Nuts 64 can be engaged to the studs 62 to secure the first mounting surface 36 to the tapping sleeve flange 22. In other embodiments the engagement portions comprise apertures 66 through the first mounting surface. Bolts 68 are disposable through apertures 66, 26 in the body 34 and the tapping sleeve flange 22. Nuts 70 can be engaged to the bolts 68 to secure the first mounting surface 36 to the tapping sleeve flange 22.

The second mounting surface 38 is typically planar and adapted to provide a fluid tight joint when mounted to a valve. The second mounting surface 38 can include a recessed portion 72 extending around part or the entire body aperture 42 and recessed below the mounting surface 38. The recessed portion 72 accepts a mating projection in a valve to help center the valve to the second mounting surface 38.

In some embodiments, studs 74 fastened to the second mounting surface 38 and project outwardly therefrom. The studs 74 are disposable through apertures in the valve. Nuts 76 can be engaged to the studs 74 to secure the second mounting surface 38 to the valve. In other embodiments the engagement portions comprise body apertures 66. Bolts 68 are disposable through body apertures 66 and apertures in the valve. Nuts 70 can be engaged to the bolts 68 to secure the second mounting surface 38 to the valve.

Figure 6:
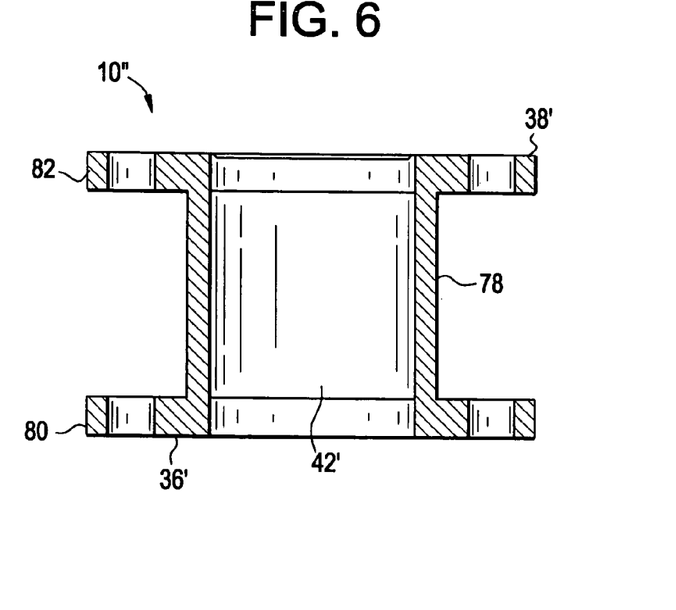
FIG. 6 is a sectional view of a second embodiment of a line stop adapter.

In one embodiment 10" advantageously used with pipe sizes over ten inches in diameter a hub 78 is disposed between the first and second flanges 80, 82 defining mounting surfaces 36', 38' (FIG. 6). The interior wall and body aperture extend through the hub fluidly connecting the mounting surfaces.

The disclosed line stop adapter 10, 10', 10" is advantageously used in a "wet" operation to repair a broken or leaking pipe 18. As used herein a wet operation is performed while the water supply in the water main or other water distribution pipe is turned on and water is contained under pressure in the pipe 18. A dry operation is performed after the water supply in the water main or other water distribution pipe is turned off and water is drained from the pipe 18.

The broken pipe section will be excavated and exposed. A tapping sleeve 12 comprising a set of two tapping sleeve saddles 14, 16 and a gasket 20 is secured over the pipeline adjacent the broken pipe section. When the saddles 14, 16 are fastened the gasket 20 is clamped between the pipe 18 and the saddles 14, 16, providing a fluid seal. An example of a suitable tapping sleeve is an FTSS-1350-12 available from the Ford Meter Box Co. located in Wabash, Ind. A first gasket 84 is placed over the tapping fitting flange 22.

Figure 9:
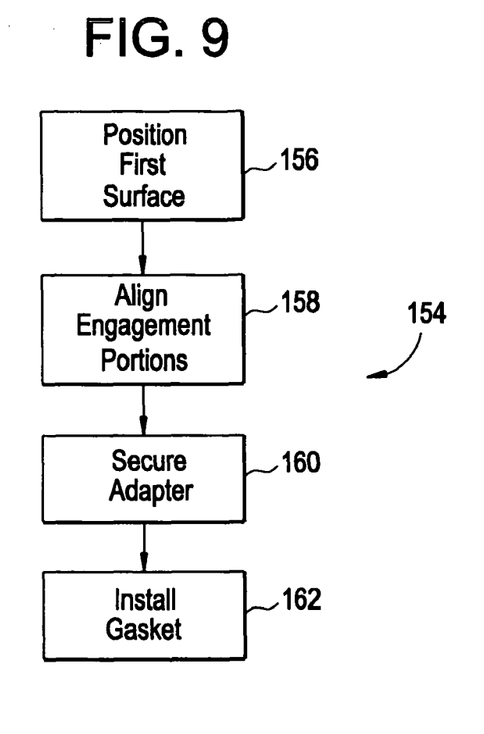
FIG. 9 is a flow diagram of the attach adapter step of FIG. 8.

A line stop adapter is installed 154 by positioning 156 the first mounting surface 36, 36' over the gasket 84 on the tapping fitting flange 22. The engagement portions 66, 62 of the adapter first mounting surface are aligned 158 with apertures 26 in the tapping fitting flange 22 and the adapter 10, 10', 10" is secured 160 to the tapping fitting flange 22 with nuts 64. A second gasket 86 is placed 162 over the adapter second mounting surface 38, 38'.

Figure 10:
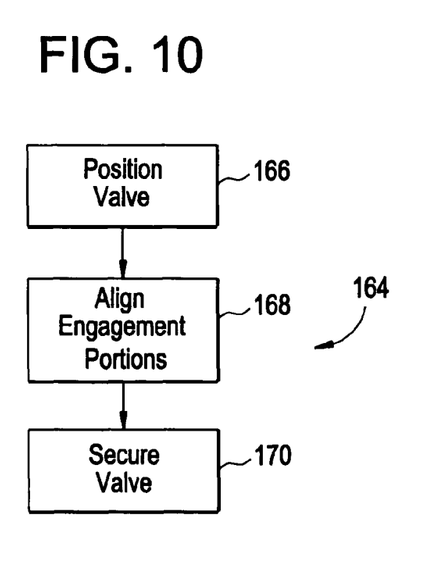
FIG. 10 is a flow diagram of the attach valve step of FIG. 9.

A temporary valve 88 is installed 164 by positioning 166 the valve flange 92 over the gasket 86 on the adapter second mounting surface 38, 38'. The engagement portions 66, 74 of the adapter second mounting surface are aligned 168 with apertures 90 in the valve flange 92 and the adapter 10, 10' is secured 170 to the valve 88 with nuts 76. The valve 88 includes a valve body 94 defining an interior valve pathway 96. The valve 88 incorporates a valve mechanism 98 that allows a user to selectively allow or prevent communication through the interior valve pathway 96. Advantageously, the valve mechanism 98 allows a user to access the full width of the interior valve pathway 96 when open. A tool mounting flange 100 is adapted for temporary mounting to a drilling apparatus 102 and a line stop apparatus 104. An example of a suitable valve is a 12 inch knife gate valve available from Black Bear Valve located in Temecula, Calif.

Figure 11:
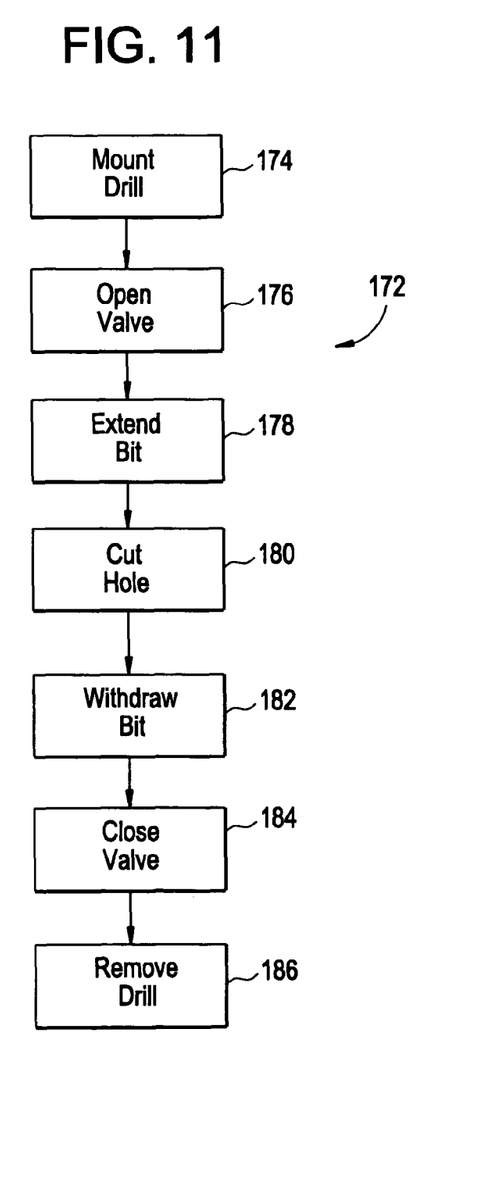
FIG. 11 is a flow diagram of the form opening step of FIG. 9.

To form 172 an opening in the pipe 18, a drilling apparatus 102 having a rotatable drill bit is mounted 174 to the tool mounting flange 100. An example of a suitable drilling apparatus is a hydra-tapper available from Hydra-Stop, Inc. located in Blue Island, Ill. The drill bit is a typical hole saw type drill bit. The mounted drilling apparatus 102 allows a user to extend 178 the drill bit through the interior valve pathway 96 (after opening 176 the valve mechanism 98), and adapter body aperture 42 and into contact with the pipe 18. Rotation of the drill bit forms 180 a hole in the pipe 18, allowing fluid to move from the pipe 18 through the adapter 10, 10', 10" and valve 88. The drilling apparatus 102 prevents fluid from exiting the tool mounting flange 100. After a hole is formed in the pipe 18 the drill bit is withdrawn 182 back into the drilling apparatus 102 and the valve mechanism 98 is closed 184 to prevent fluid flow through the interior valve pathway 96. The drilling apparatus 102 is then removed 186 from the tool mounting flange 100.

Figure 7:
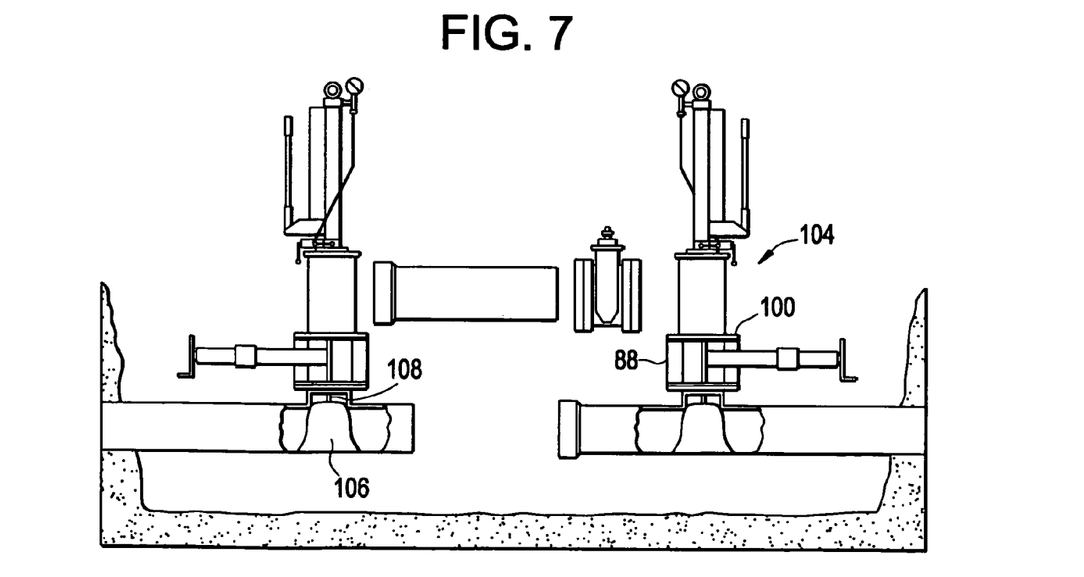
FIG. 7 is a simplified side view, partly in phantom, of a pipe repair.
Figure 8:
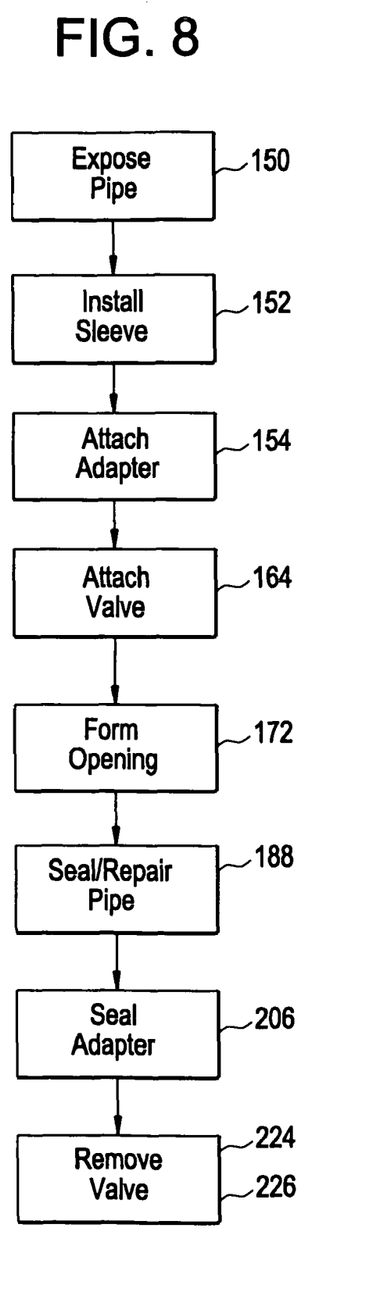
FIG. 8 is a flow diagram of a method of repairing a pipe.
Figure 12:
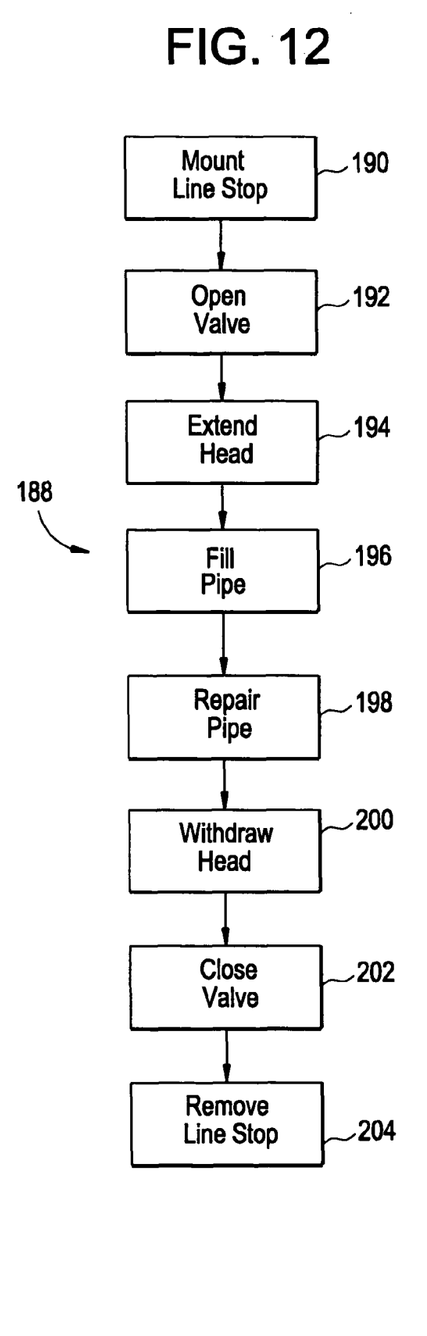
FIG. 12 is a flow diagram of the seal/repair pipe step of FIG. 9.

To seal 188 the ruptured pipe 18, a line stop apparatus 104 is mounted 190 to the tool mounting flange 100 (FIG. 7). The line stop apparatus 104 prevents fluid from exiting the tool mounting flange 100. An example of a suitable line stop apparatus is the hydra-stopping system available from Hydra-Stop, Inc. located in Blue Island, Ill. The line stop apparatus 104 comprises a sealing head 106 connected to a ram 108. The valve mechanism 98 is opened 192 to allow the sealing head 106 to be extended 194 through the interior valve pathway 96, through the line stop adapter body aperture 42, through the newly formed pipe aperture and into the interior of the pipe 18. Once inside, the sealing head 106 fills 196 the pipe interior so that fluid flow between the pipe 18 and the sealing head 106 is substantially stopped.

In this condition fluid remains under pressure "upstream" of the sealing head 106. Thus, fluid will be available to upstream users. However, "downstream" of the sealing head fluid 106 flow will be substantially stopped, allowing workers to repair or replace the broken pipe section. Once the broken pipe has been repaired 198 the sealing head 106 is withdrawn 200 into the line stop apparatus 104 and the valve mechanism 98 is closed 202 to prevent fluid flow through the interior valve pathway 96. In this condition fluid can move under pressure from upstream of the tapping sleeve through the repaired pipe and into the downstream distribution system.

Figure 13:
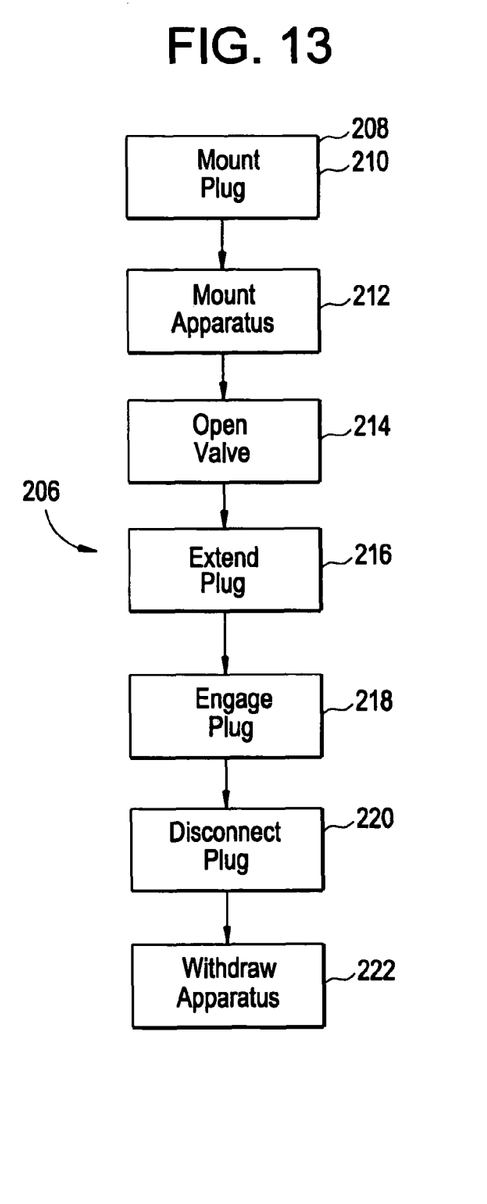
FIG. 13 is a flow diagram of the seal adapter step of FIG. 9.

The line stop apparatus 104 is removed 204 from the tool mounting flange 100. To seal 206 the adapter 10, 10', 10", a completion plug 46 is removably mounted 210 to the completion plug installation equipment (such as the tapping machine). The completion plug installation equipment with the completion plug 46 is mounted 212 to the tool mounting flange 100. The valve mechanism 98 is opened 214 to allow the completion plug 46 to be inserted 216 through the interior valve pathway 96 and into the adapter body aperture 42. The completion plug 46 is engaged 218 with the line stop adapter wall portion 44 to fluidly seal the body aperture 42. In this condition fluid flow through the adapter body aperture 42 is prevented by engagement of the completion plug 46 and the wall portion 44. The completion plug installation equipment is disconnected 220 from the completion plug 46 and withdrawn 222 and the valve 88 and completion plug installation equipment are removed 224 from the adapter second mounting surface 38. A blind flange 110 and seal 112 can be mounted 226 over the adapter second mounting surface 38 using the second mounting surface engagement portions 66, 74 and the excavation can be filled.

While preferred embodiments have been set forth for purposes of illustration, the foregoing description should not be deemed a limitation of the disclosure herein. Accordingly, various modifications, adaptations and alternatives may occur to one skilled in the art without departing from the spirit and scope of the present disclosure.

What is claimed:

1. A line stop adapter for use with a tapping sleeve and a completion plug, comprising:
    a body including a tapping flange mounting surface and an opposing valve mounting surface, the tapping flange mounting surface adapted for mounting to a tapping sleeve flange and the valve mounting surface adapted for mounting to a temporary valve;
    an interior wall defining a body aperture fluidly connecting the mounting surfaces, the interior wall including a wall portion adapted to receive and selectively engage the completion plug and allow the completion plug to fluidly seal the body aperture, the wall portion defining at least one radially aligned aperture;
    a pin disposed in the wall portion aperture, whereby movement of the pin radially inwardly into the body aperture allows selective engagement of the pin with a circumference of the completion plug; and
    a plurality of engagement portions arranged around the body aperture for securing the tapping flange mounting surface to the tapping sleeve.

2. The line stop adapter of claim 1 wherein the wall portion is adapted to receive and selectively engage the completion plug and prevent fluid communication between the interior wall and a circumference of the completion plug.

3. The line stop adapter of claim 1 wherein the wall portion comprises interior threads for selective engagement with external threads on a circumference of the completion plug.

4. The line stop adapter of claim 1 wherein the wall portion aperture includes internal threads and the pin includes external threads.

5. The line stop adapter of claim 1 wherein each engagement portion is independently selected from an aperture and a threaded stud arranged around the body aperture and projecting outwardly from the tapping flange mounting surface.

6. The line stop adapter of claim 1 comprising a plurality of threaded studs arranged around the body aperture and projecting outwardly from the valve mounting surface.

7. The line stop adapter of claim 1 wherein each engagement portion comprises a threaded stud diametrically arranged around the body aperture in a first diameter and projecting outwardly from the tapping flange mounting surface and comprising a plurality of threaded studs diametrically arranged around the body aperture in a second diameter different than the first diameter and projecting outwardly from the valve mounting surface.

8. The line stop adapter of claim 1 wherein the tapping flange mounting surface and the valve mounting surface are each circular and have different diameters.

9. The line stop adapter of claim 1 wherein the tapping flange mounting surface and the valve mounting surface are each circular and have substantially identical diameters.

10. The line stop adapter of claim 1 wherein the tapping flange mounting surface defines a first effective diameter, the valve mounting surface defines a second effective diameter and comprising a hub fluidly connecting the mounting surfaces, wherein the hub defines an effective diameter different than either the first or second diameters.

11. The line stop adapter of claim 1 wherein the tapping flange mounting surface defines a first effective diameter; the valve mounting surface defines a second effective diameter and comprises opposing upper and lower surfaces radially extending from the body aperture, a plurality of apertures defined between the upper and lower surfaces and spaced around the body aperture; and comprising a hub fluidically connecting the mounting surfaces, wherein the hub defines an effective diameter different than either the first or second diameters.

12. A system for temporarily stopping fluid flow through a section of pipeline, comprising:
    a tapping sleeve saddle comprising a tapping sleeve body and a tapping sleeve flange fluidically connected to the tapping sleeve body, the tapping sleeve flange defining a plurality of spaced apertures;
    a line stop adapter, including,
    a body including a tapping flange mounting surface and an opposing valve mounting surface, the tapping flange mounting surface adapted for mounting to the tapping sleeve flange and the valve mounting surface adapted for mounting to a valve,
    a plurality of engagement portions arranged around the body aperture for securing the tapping flange mounting surface to the tapping sleeve, and
    an interior wall defining a body aperture fluidly connecting the mounting surfaces, the interior wall including a wall portion adapted to receive and selectively engage a completion plug and allow the completion plug to fluidly seal the body aperture, the wall portion defining at least one radially aligned aperture;
    a completion plug for engagement with the wall portion to fluidly seal the body aperture;
    a pin disposed in the wall portion aperture, whereby movement of the pin radially inwardly into the body aperture allows selective engagement of the pin with a circumference of the completion plug; and
    a valve comprising a valve body disposed between opposing mounting flanges, the valve body housing a valve mechanism, one mounting flange adapted for temporary mounting to the line stop adapter valve mounting surface and the other mounting surface adapted for temporary mounting to a drilling apparatus and a line stop apparatus.

13. A method of temporarily stopping fluid flow through a section of pipeline, comprising:
    securing a tapping sleeve saddle to the pipeline, the tapping sleeve saddle having a tapping sleeve body and a tapping sleeve flange defining a central aperture that is fluidically connected to the tapping sleeve body;
    attaching a line stop adapter to the tapping sleeve flange, the line stop adapter including a body having an interior wall defining a body aperture, the body aperture being in communication with tapping sleeve flange central aperture;
    attaching a temporary valve to the line stop adapter, the valve including a valve body disposed between a line stop adapter mounting flange and a tool mounting flange, an interior valve pathway extending from line stop adapter mounting flange to the tool mounting flange within the valve body, a valve mechanism selectively actuatable to allow or prevent communication through the interior valve pathway, the line stop adapter mounting flange being mounting to the line stop adapter;
    mounting a drilling apparatus to the valve tool mounting flange, the drilling apparatus having an extendable drill bit;
    actuating the valve mechanism to allow communication through the interior valve pathway;

extending drill bit through the interior valve pathway, through the line stop adapter body aperture, through the tapping sleeve central aperture, and into contact with the pipeline;

drilling an opening in the pipeline with the drill bit;

withdrawing the drill bit;

actuating the valve mechanism to prevent communication through the interior valve pathway;

removing the drilling assembly from the tool mounting flange;

mounting a line stop apparatus to the tool mounting flange;

actuating the valve mechanism to allow communication through the interior valve pathway;

extending a sealing head of the line stop apparatus through the interior valve pathway, through the line stop adapter body aperture, through the tapping sleeve central aperture, through the pipeline opening and into an interior of the pipeline, whereby fluid flow through the pipeline is substantially stopped by the sealing head;

withdrawing the sealing head to allow fluid flow through the pipeline;

actuating the valve mechanism to prevent communication through the interior valve pathway;

removing the line stop apparatus from the tool mounting flange;

removing the sealing head from the line stop apparatus;

mounting a completion plug onto a completion plug installation equipment;

mounting the line stop apparatus to the tool mounting flange;

actuating the valve mechanism to allow communication through the interior valve pathway;

extending the completion plug through the interior valve pathway and into the line stop adapter body aperture;

engaging the completion plug with the line stop adapter interior wall to fluidly seal the body aperture; and removing the valve and line stop apparatus from the line stop adapter.

14. The method of claim 13 wherein the tapping sleeve flange defines a plurality of spaced apertures and the line stop adapter body also has a tapping flange mounting surface and an opposed valve mounting surface, the tapping flange mounting surface having a plurality of engagement portions arranged around the body aperture, attaching the line stop adapter comprising:

positioning the line stop adapter tapping flange mounting surface adjacent the tapping sleeve flange;

aligning the line stop adapter tapping flange mounting surface engagement portions with the tapping sleeve flange apertures; and securing the line stop adapter tapping flange mounting surface engagement portions with the tapping sleeve flange apertures.

15. The method of claim 14 wherein the valve line stop adapter mounting flange defines a plurality of spaced apertures and the line stop adapter body valve mounting surface has a plurality of engagement portions arranged around the body aperture, attaching the line valve comprising:

positioning the valve line stop adapter mounting flange adjacent the line stop adapter body valve mounting surface;

aligning the valve line stop adapter mounting flange apertures with the line stop adapter valve mounting surface engagement portions; and securing the line stop adapter valve mounting surface engagement portions with the valve line stop adapter mounting flange apertures.

* * * * *